United States Patent [19]
Biebl et al.

[11] Patent Number: 5,450,754
[45] Date of Patent: Sep. 19, 1995

[54] PRESSURE SENSOR

[75] Inventors: Markus Biebl; Thomas Scheiter; Helmut Klose, all of Munich, Germany

[73] Assignee: Siemens Aktiengesellschaft, Munich, Germany

[21] Appl. No.: 207,067

[22] Filed: Mar. 8, 1994

[30] Foreign Application Priority Data

Mar. 30, 1993 [DE] Germany ............ 43 10 244.1

[51] Int. Cl.⁶ .................................. G01L 9/12
[52] U.S. Cl. .................................. 73/718; 73/724
[58] Field of Search ............ 73/718, 719–721, 73/724, 725, 727, 728, 706, 861.52; 338/4

[56] References Cited

U.S. PATENT DOCUMENTS

| | | | |
|---|---|---|---|
| 4,443,383 | 5/1984 | Binder et al. | 73/718 |
| 5,022,270 | 6/1991 | Rud, Jr. | 73/706 |
| 5,321,989 | 6/1994 | Zimmer et al. | 73/724 |

FOREIGN PATENT DOCUMENTS

| | | | |
|---|---|---|---|
| 0097339 | 1/1984 | European Pat. Off. . | |
| 3704870C1 | 4/1988 | Germany | G01L 15/00 |
| 4042336 | 8/1991 | Germany . | |

Primary Examiner—Richard Chilcot
Assistant Examiner—Elizabeth L. Doughery
Attorney, Agent, or Firm—Hill, Steadman & Simpson

[57] ABSTRACT

A pressure sensor comprises a matrix of diaphragms of polysilicon which, via a structure of electrical conductors, are arranged at an upper side of a silicon substrate for the determination of their variable electrical capacitance dependent on the pressure stressing. These diaphragms are present in at least two different sizes. Capacitances of these diaphragms of a same size are respectively connected to form a sub-unit such that basic capacitances of these sub-units are of a respectively same size.

6 Claims, 2 Drawing Sheets

PRESSURE SENSOR

BACKGROUND OF THE INVENTION

The present invention is directed to a pressure sensor for acquisition of pressure over a broad range of measurement.

Many technical applications such as, for example, vacuum technology, require the mensurational acquisition of pressure with high precision over a range of measurement that is several orders of magnitude broad. Due to their technical design, by contrast, conventional pressure sensors have an extremely limited range of pressure measurement. Up to now, a plurality of individual pressure sensors having ranges of measurement adjoining one another were therefore simultaneously utilized. The following disadvantages, however, result therefrom. Since a plurality of sensors are required, the arrangement is correspondingly more complicated. The output signals of the sensors are generally not compatible with one another and must therefore be evaluated in an additional, external electronic circuit, which recognizes which of the sensors is working in the permitted range of measurement at the moment. The range of measurement that can be achieved is greatly restricted due to the slight over-pressure capacity of traditional pressure sensors.

SUMMARY OF THE INVENTION

An object of the present invention is to specify a pressure sensor whose range of measurement, given simultaneously high measuring precision, is many times greater than that of traditional pressure sensors.

This object is achieved by providing a pressure sensor comprising a matrix of diaphragms with a structure of electrical conductors attached thereto. A variable electrical capacitance of the diaphragms is measured via the conductors with respect to an area over which they are attached. The diaphragms have at least two different sizes. Diaphragms of a same size are respectively connected by said structure of electrical conductors to form a respective sub-unit such that a sum of capacitively effective areas of the diaphragms is of a same size for each of the sub-units.

The pressure sensor of the present invention is composed of a matrix of pressure sensors having different diaphragm sizes. The electrical capacitance of these diaphragms relative to the substrate is measured and the size of the pressure is determined therefrom. A number of pressure sensors having the same diaphragm size and, thus, a defined range of measurement, are therefore respectively combined to form a sub-unit so that the sum of the (capacitively effective) diaphragm areas is of the same size in all sub-units. The diaphragms in these sub-units are respectively connected in parallel, so that their capacitance adds up and is therefore of the same size for all sub-units in the non-deflected condition, i.e. given normal pressure. The diaphragm sizes in the various sub-units are selected such that the ranges of measurement of the sub-units adjoin one another, so that the evaluation is simplified. The manufacture of the individual diaphragms advantageously occurs in processes that are compatible with IC technology such as, for example, silicon micro-machining.

A description of the pressure sensors of the invention and their manufacture follows with reference to FIG. 1 through 5.

DESCRIPTION OF THE PREFERRED EMBODIMENTS

Figure 1:
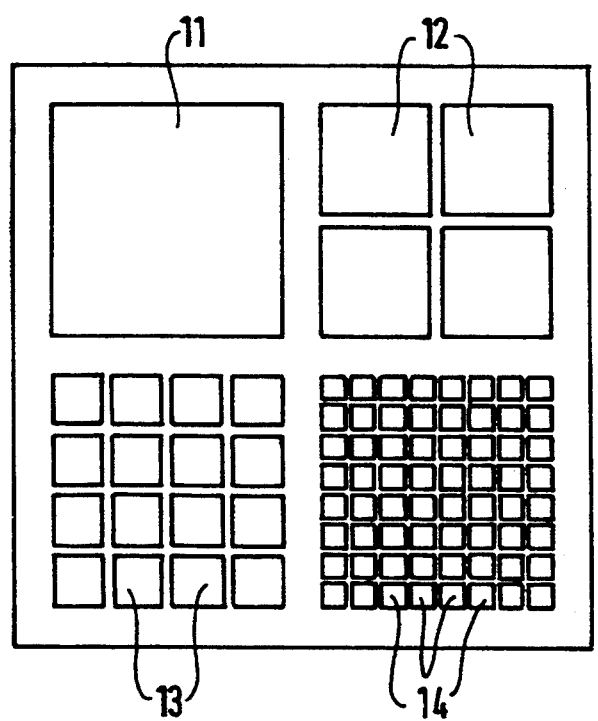
FIG. 1 shows a pressure sensor of the invention in a plan view.

The selection of the size and plurality of the individual diaphragms is illustrated in FIG. 1. It is assumed for the sake of simplicity that the edges of the diaphragms secured to the substrate are negligible compared to the area, so that the capacitance is essentially established by the area of the diaphragms. In the non-deflected condition, the overall capacitance of the diaphragms connected in parallel is proportional to their overall area. The basic capacitance, for example, is of the same size for sub-units when these sub-units are composed of $2^{2i}$ diaphragms having the $2^{-2i}$ multiple of a base area, whereby i is a non-negative, whole number. Four such sub-units combined in a square are shown in plan view in FIG. 1 for i=0, 1, 2 and 3. The diaphragms 11, 12, 13, 14 need not be quadratic, but can basically exhibit any easily manufacturable shape. In particular, they can be rectangular or round. The diaphragms belonging to the individual sub-units also need not be combined in a small space, but can be distributed over the pressure sensor. The only concern is the suitable interconnection (parallel connection) of respectively so many diaphragms of the same size that the basic capacitance of such a sub-unit is respectively the same. A plurality of sub-units having the same diaphragm size can be present, for example, for a range of measurement having particular demands or for adaptation of the strength of the output signal. In a specific embodiment of the pressure sensor of the invention, it can thus be matched to the respective requirements of the individual case, particularly to the manufacturing method employed.

Figure 2:
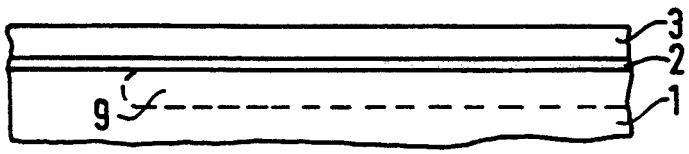
FIGS. 2 through 5 show a portion of a pressure sensor of the invention in cross section after various stages of manufacture.
Figure 3:
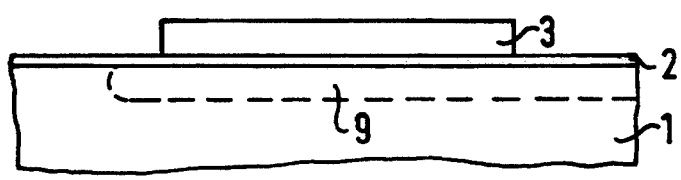

Such a manufacturing method is set forth below with reference to the other figures. The manufacture becomes especially simple when the electrically conductive structure via which the drive and measurement of the individual diaphragms occurs can be fashioned in a substrate. A substrate 1 of semiconductor material wherein the conductive structure is produced by doping upon employment of mask technology is therefore particularly suitable. For example, the substrate can be silicon and the doping can be produced by ion implantation. An insulating layer 2 and an auxiliary layer 3 are deposited on the substrate 1 with the doped region 9 according to FIG. 2. The insulating layer 2 serves the purpose of insulating the diaphragms from the conductive substrate, corresponding to the dielectric of a capacitor. For example, this insulating layer 2 can be a nitride ($Si_3N_4$). The auxiliary layer 3, for example, is an oxide such as, for example, $SiO_2$. This auxiliary layer 3 is structured so that the remaining portions respectively approximately correspond to the dimensions of the diaphragms to be manufactured (see FIG. 3).

After this, a further auxiliary layer 4 of, for example, the same material as the auxiliary layer 3, is potentially applied, and a layer 5 provided for the membranes and which, for example, is polysilicon, is applied thereon. The further auxiliary layer 4 serves the purpose of producing strip-shaped spurs by structuring laterally of a respectively remaining portion of the auxiliary layer 3.

Figure 4:
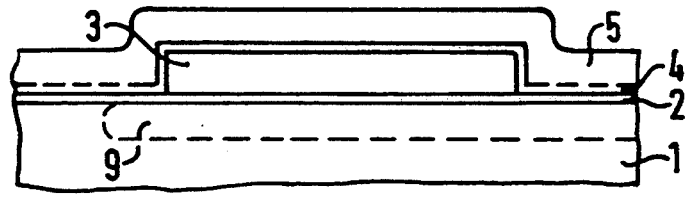
Figure 5:
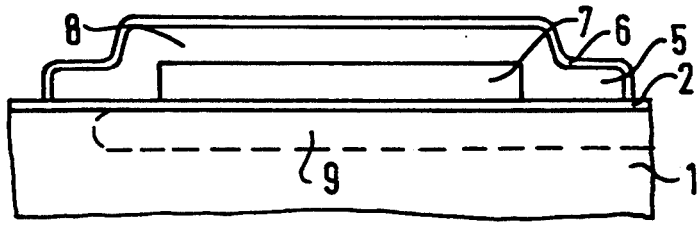

By removing these spurs, etching channels are formed under the polysilicon layer 5 through which the material of the auxiliary layer 3 can be removed in order to thus be able to produce the cavities 7 under the diaphragms formed by the polysilicon layer 5. These lateral spurs for the production of the etching channels can also have been already produced in the structuring from the auxiliary layer 3. The further auxiliary layer 4 can then be omitted. The polysilicon layer 5 is structured so that portions of this polysilicon layer 5 provided for the individual diaphragms remain. These portions, for example, can be quadratic and can be arranged in matrix-like fashion as shown, for example, in the matrix of FIG. 1. The edges of these portions of the polysilicon layer 5 respectively rest on the insulating layer 2, whereby this connection between the polysilicon layer 5 and the insulating layer 2 is interrupted at locations by the strip-shaped spurs of the auxiliary layer 3 or, respectively, of the further auxiliary layer 4. These strip-shaped spurs of, for example, $SiO_2$ are selectively removed relative to the material of the insulating layer 2 (for example, $Si_3N_4$) and to the material of the layer 5 (for example, polysilicon) in an etching process, for example a wet-chemical etching upon employment of HF. Etching channels, i.e. channel-like openings between the insulating layer 2 and the polysilicon layer 5, thereby arise, these making the remaining portion of the auxiliary layer 3 under the polysilicon layer 5 accessible from the outside. Given continuation of the etching process, an etching attack onto the material ($SiO_2$) of the auxiliary layer 3 occurs through these etching channels. The residues of the auxiliary layer 3 are therefore completely removed. Cavities thereby arise under the polysilicon layer 5, these being respectively spanned by a contiguous portion of the polysilicon layer 5. As mentioned, the edges are respectively connected to the substrate (the insulating layer 2) when the etching channels are closed, for example, with a sealing oxidation. The polysilicon layer is doped electrically conductively, for example by ion implantation, in one of the work steps and therefore respectively forms the cooperating electrode for the electrode lying therebelow (doped region 9) in the substrate. The lateral portions of the further auxiliary layer 4 are shown with broken lines in FIG. 4 in order to indicate that only the strip-shaped spurs of this further auxiliary layer 4 provided for the etching channels are present in this region. As shown in FIG. 5, the diaphragm 8 that is respectively formed by a portion of the polysilicon layer 5 is covered with a passivation layer 6.

The sensors formed by the individual diaphragms have a built-in over-pressure protection in the form of the silicon substrate and have an over-pressure capacitance of several orders of magnitude of the nominal range of measurement. Even after a pressure stressing wherein the corresponding diaphragm was pressed against the substrate, no individual sensor exhibits a mechanical hysteresis or a zero-point shift. These properties of the diaphragms and the possibility of simultaneously manufacturing a plurality of individual sensors together with the corresponding evaluation electronics on a silicon chip with the assistance of semiconductor technology enable a simple manufacture of the pressure sensor of the invention. Each of the sub-units responsible for different ranges of measurement is connected to a temperature-compensated amplifier whose output signal is linearized. This respective electronic circuit, as mentioned, can be indicated in the semiconductor component, i.e. for example, on the silicon substrate.

Since the overall capacitance of every sub-unit is of the respectively same size due to the parallel connection of the diaphragms, the same amplifier circuit can be utilized for all sub-units. The signals obtained after the amplification and linearization are then supplied to an evaluation circuit which determines which of the sub-units is operating in the range of measurement permitted for it and which offers a corresponding output signal that derives from this sub-unit. Potentially, the analog output signal of this evaluation circuit can be digitized by a following analog-to-digital converter. Since the pressure sensor of the invention supplies only one output signal, the external circuit expense can be reduced to a minimum.

Although various minor changes and modifications might be proposed by those skilled in this art, it is understood that we wish to include within the scope of the patent warranted hereon all such changes and modifications as reasonably come within our contribution to the art.

We claim as our invention:

1. A pressure sensor, comprising:
   a plurality of diaphragms on a substrate providing a variable electrical capacitance;
   electrical conductors connected to the diaphragms;
   the diaphragms having at least first and second different sizes;
   diaphragms of the first size being grouped together as a first sub-unit and diaphragms of the second size being grouped together as a second sub-unit; and
   the sizes of the diaphragms being chosen such that a total capacitance of all diaphragms of the first sub-unit equals a total capacitance of all diaphragms of the second sub-unit.

2. A pressure sensor according to claim 1 wherein the first sub-unit has a single diaphragm of given area and the second sub-unit has four diaphragms which combined have a substantially same total area as the single diaphragm of the first sub-unit.

3. A pressure sensor according to claim 1 wherein the first sub-unit has a single diaphragm, a second sub-unit has four diaphragms, a third sub-unit has sixteen diaphragms, and a fourth sub-unit has sixty-four diaphragms, and wherein a total area of the diaphragms of each of the first through fourth sub-units is substantially the same.

4. A pressure sensor according to claim 1 wherein the diaphragms have edges secured to said substrate on an electrically insulating layer such that a cavity is present between every diaphragm and said insulating layer.

5. A pressure sensor according to claim 1 wherein the substrate has its surface facing toward the diaphragms doped to form said electrical conductors connected to the diaphragms.

6. A pressure sensor according to claim 1 wherein the substrate comprises silicon and the diaphragms comprise polysilicon.

* * * * *